US012659702B2

(12) United States Patent
Belling

(10) Patent No.: US 12,659,702 B2
(45) Date of Patent: Jun. 16, 2026

(54) PROCEDURE TO JOIN A MULTICAST SESSION

(71) Applicant: Nokia Technologies Oy, Espoo (FI)

(72) Inventor: Horst Thomas Belling, Munich (DE)

(73) Assignee: Nokia Technologies Oy, Espoo (FI)

( * ) Notice: Subject to any disclaimer, the term of this patent is extended or adjusted under 35 U.S.C. 154(b) by 412 days.

(21) Appl. No.: 18/251,866

(22) PCT Filed: Nov. 9, 2020

(86) PCT No.: PCT/US2020/059691
§ 371 (c)(1),
(2) Date: May 4, 2023

(87) PCT Pub. No.: WO2022/098369
PCT Pub. Date: May 12, 2022

(65) Prior Publication Data
US 2024/0015483 A1     Jan. 11, 2024

(51) Int. Cl.
*H04H 20/71*        (2008.01)
*H04W 4/08*         (2009.01)
*H04W 76/40*        (2018.01)

(52) U.S. Cl.
CPC ............. *H04W 4/08* (2013.01); *H04W 76/40* (2018.02)

(58) Field of Classification Search
USPC .......................................................... 370/312
See application file for complete search history.

(56) References Cited

U.S. PATENT DOCUMENTS

| | | | | |
|---|---|---|---|---|
| 11,159,337 | B1 * | 10/2021 | Mishra .................... | H04L 45/16 |
| 2007/0183434 | A1 | 8/2007 | Pandey | |
| 2007/0220129 | A1 * | 9/2007 | Kwon ................... | H04L 67/125 |
| | | | | 709/205 |
| 2020/0267513 | A1 | 8/2020 | Zhu et al. | |
| 2021/0105196 | A1 * | 4/2021 | Dao ........................ | H04L 47/24 |
| 2021/0243135 | A1 * | 8/2021 | Garcia-Luna-Aceves ................... | |
| | | | | H04L 69/22 |
| 2021/0336811 | A1 * | 10/2021 | Mishra ................... | H04L 45/50 |
| 2023/0354106 | A1 * | 11/2023 | Godin ................... | H04W 72/30 |

(Continued)

FOREIGN PATENT DOCUMENTS

| | | |
|---|---|---|
| CN | 1618055 A | 5/2005 |
| CN | 1996932 A | 7/2007 |
| CN | 111448808 A | 7/2020 |

(Continued)

OTHER PUBLICATIONS

Office action received for corresponding Chinese Patent Application No. 202080108333.X, dated Apr. 20, 2024, 9 pages of office action and 7 pages of summary/ translation available.

(Continued)

*Primary Examiner* — Chuong T Ho
(74) *Attorney, Agent, or Firm* — Nokia Technologies Oy

(57) ABSTRACT

Methods, systems, apparatuses, and computer program products are provided for joining a multicast session of a communications network. In this regard, a control plane (CP) join request for a multicast service is received from user equipment. Furthermore, provision of a reject message associated with the CP join request to the user equipment is caused in response to a determination that a multicast distribution session is not available for a multicast address associated with the CP join request.

15 Claims, 5 Drawing Sheets

(56) References Cited

U.S. PATENT DOCUMENTS

2024/0237033 A1* 7/2024 Zong ........................ H04W 4/08

FOREIGN PATENT DOCUMENTS

| CN | 111866755 A | 10/2020 |
|---|---|---|
| CN | 111866756 A | 10/2020 |
| EP | 1475973 A1 | 11/2004 |
| TW | 200427269 A | 12/2004 |
| WO | 03/052570 A1 | 6/2003 |
| WO | 2007/054032 A1 | 5/2007 |
| WO | 2007/086680 A1 | 8/2007 |
| WO | 2013/060167 A1 | 5/2013 |
| WO | 2019/114938 A1 | 6/2019 |

OTHER PUBLICATIONS

Notice of Allowance received for corresponding Chinese Patent Application No. 202080108333.X, dated Mar. 14, 2025, 5 pages of Notice of Allowance and no page of translation available.
"Digital cellular telecommunications system (Phase 2+); Universal Mobile Telecommunications System (UMTS); LTE; IP multimedia call control protocol based on Session Initiation Protocol (SIP) and Session Description Protocol (SDP); Stage 3 (3GPP TS 24.229 version 8.20.0 Release 8)", ETSI TS 124 229, V8.20.0, Jul. 2012, pp. 1-653.
Jiaqi et al., "Design of Bluetooth multicast security mechanism based on trust mechanism", Electronic Technology & Software Engineering, No. 06, 2020, 6 pages.

Office action received for corresponding European Patent Application No. 20821081.5, dated Mar. 17, 2025, 6 pages.
"3rd Generation Partnership Project; Technical Specification Group Services and System Aspects; Study on architectural enhancements for 5G multicast-broadcast services (Release 17)", 3GPP TR 23.757, V1.1.0, Oct. 2020, pp. 1-274.
Cain et al., "Internet Group Management Protocol, Version 3", RFC 3376, Network Working Group, Oct. 2002, pp. 1-53.
Conta et al., "Internet Control Message Protocol (ICMPv6) for the Internet Protocol Version 6 (IPv6) Specification", RFC 4443, Network Working Group, Mar. 2006, pp. 1-24.
"3rd Generation Partnership Project; Technical Specification Group Services and System Aspects; Wireless and wireline convergence access support for the 5G System (5GS) (Release 16)", 3GPP TS 23.316, V16.5.0, Sep. 2020, pp. 1-83.
"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.
International Search Report and Written Opinion received for corresponding Patent Cooperation Treaty Application No. PCT/US2020/059691, dated Jun. 24, 2021, 14 pages.
"3rd Generation Partnership Project; Technical Specification Group Services and System Aspects; Architectural enhancements for 5G multicast-broadcast services; Stage 2 (Release 17)", 3GPP TS 23.247, V17.6.0, Mar. 2023, pp. 1-115.
Office action received for corresponding Chinese Patent Application No. 202080108333.X, dated Oct. 1, 2024, 5 pages of office action and 8 pages of translation/summary available.
Office action received for corresponding Indian Patent Application No. 202347037301, dated Aug. 22, 2024, 6 pages.

* cited by examiner

400

RECEIVE, FROM USER EQUIPMENT, A CONTROL PLANE (CP) JOIN REQUEST FOR A MULTICAST SERVICE

402

CAUSE PROVISION OF A REJECT MESSAGE ASSOCIATED WITH THE CP JOIN REQUEST TO THE USER EQUIPMENT IN RESPONSE TO A DETERMINATION THAT A MULTICAST DISTRIBUTION SESSION IS NOT AVAILABLE FOR A MULTICAST ADDRESS ASSOCIATED WITH THE CP JOIN REQUEST

404

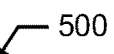

500

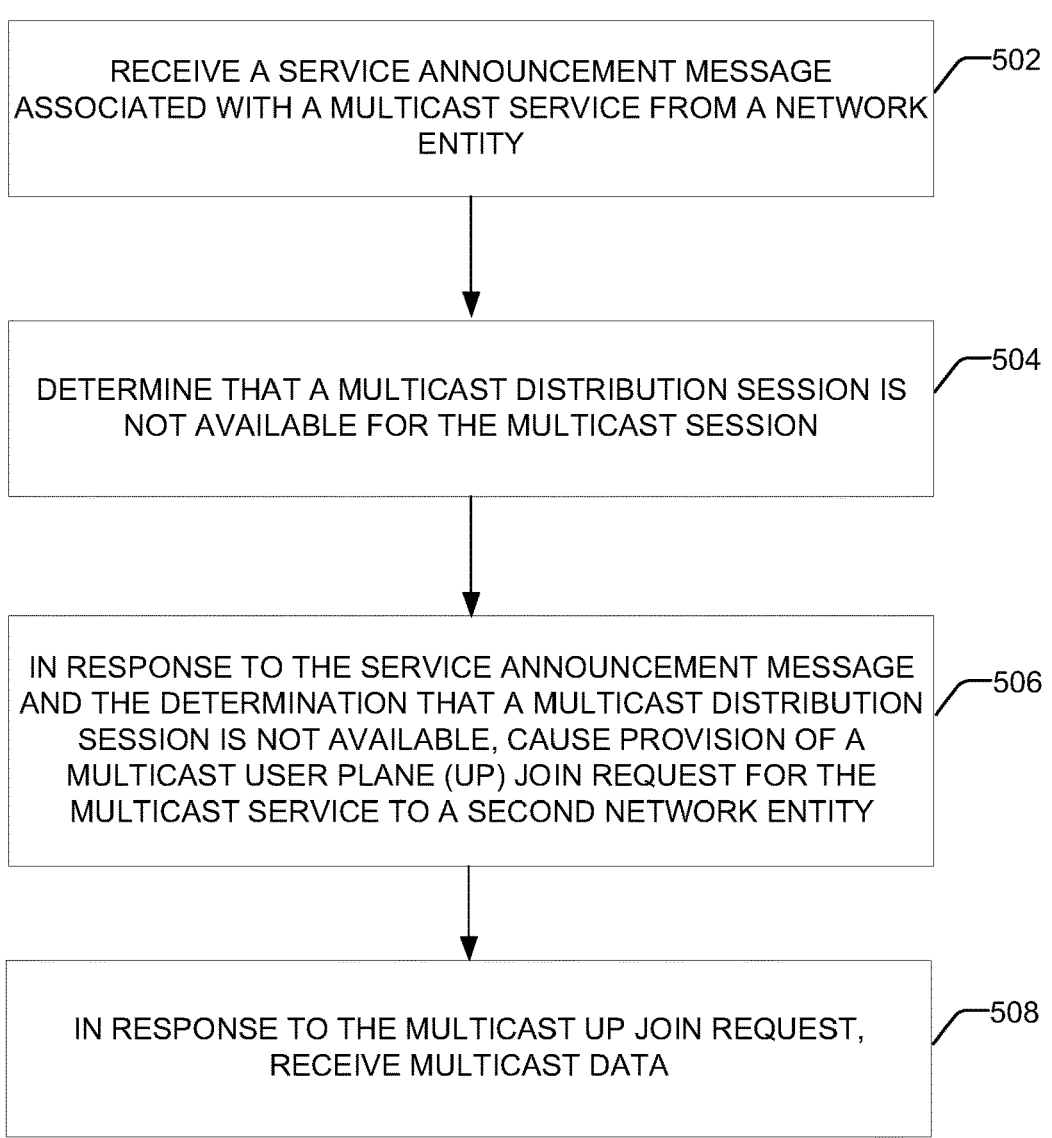

```
┌─────────────────────────────────────────────────────┐
│   RECEIVE A SERVICE ANNOUNCEMENT MESSAGE            │──502
│ ASSOCIATED WITH A MULTICAST SERVICE FROM A NETWORK  │
│                   ENTITY                            │
└─────────────────────────────────────────────────────┘
                        │
                        ▼
┌─────────────────────────────────────────────────────┐
│ DETERMINE THAT A MULTICAST DISTRIBUTION SESSION IS  │──504
│      NOT AVAILABLE FOR THE MULTICAST SESSION        │
└─────────────────────────────────────────────────────┘
                        │
                        ▼
┌─────────────────────────────────────────────────────┐
│ IN RESPONSE TO THE SERVICE ANNOUNCEMENT MESSAGE     │
│ AND THE DETERMINATION THAT A MULTICAST DISTRIBUTION │──506
│  SESSION IS NOT AVAILABLE, CAUSE PROVISION OF A     │
│  MULTICAST USER PLANE (UP) JOIN REQUEST FOR THE     │
│  MULTICAST SERVICE TO A SECOND NETWORK ENTITY       │
└─────────────────────────────────────────────────────┘
                        │
                        ▼
┌─────────────────────────────────────────────────────┐
│  IN RESPONSE TO THE MULTICAST UP JOIN REQUEST,      │──508
│           RECEIVE MULTICAST DATA                    │
└─────────────────────────────────────────────────────┘
```

FIG. 5

PROCEDURE TO JOIN A MULTICAST SESSION

RELATED APPLICATION

This application is a national stage application, filed under 35 U.S.C. § 371, of International Patent Application No. PCT/US2020/059691, filed on Nov. 9, 2020, which is incorporated by reference herein in its entirety.

TECHNOLOGICAL FIELD

An example embodiment of the present disclosure generally relates to communication systems and, more particularly, to a procedure to join a multicast session of a communications network.

BACKGROUND

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

Third generation partnership project (3GPP) 5G technology is a next generation of radio systems and network architecture that can deliver extreme broadband and ultra-robust, low latency connectivity. 5G technology improves a variety of telecommunication services offered to the end users and helps to support massive broadband that delivers gigabytes of bandwidth per second on demand for both the uplink and downlink transmissions. Next generation systems, which utilize the 5G architecture, utilize virtualized radio access network (RAN) functions and core network functions.

In general, a 5G network can provide data connectivity and services for internet protocol services, such as streaming television and provision of other streaming media to user devices. In some embodiments, such service provision can be provided via 5G multicast-broadcast services. For instance, it is often desirable for user equipment to join a multicast session of a 5G network. However, under the current 3GPP specifications, policies for joining a multicast session is generally limiting and/or inefficient.

BRIEF SUMMARY

Methods, apparatuses and computer program products are provided in accordance with example embodiments to provide for joining a multicast session of a communications network.

In an example embodiment, an apparatus includes processing circuitry and at least one memory including computer program code instructions that are configured to, when executed by the processing circuitry, cause the apparatus to receive, from user equipment, a control plane (CP) join request for a multicast service. The computer program code instructions are also configured to, when executed by the processing circuitry, cause the apparatus to cause provision of a reject message associated with the CP join request to the user equipment in response to a determination that a multicast distribution session is not available for a multicast address associated with the CP join request.

In some embodiments, the computer program code instructions are also configured to, when executed by the processing circuitry, cause the apparatus to determine a number of rejected CP join requests for the multicast address.

In some embodiments, the computer program code instructions are also configured to, when executed by the processing circuitry, cause the apparatus to provide information regarding the rejected CP join requests for the multicast address to another network entity.

In some embodiments, the computer program code instructions are also configured to, when executed by the processing circuitry, cause the apparatus to determine whether to establish a multicast distribution session for the multicast address based on the number of rejected CP join requests. In some embodiments, in response to a determination to proceed with establishing the multicast distribution session, the computer program code instructions are also configured to, when executed by the processing circuitry, cause the apparatus to determine whether to establish the multicast distribution session for the multicast address. Additionally, in some embodiments in response to a determination to proceed with establishing the multicast distribution session, the computer program code instructions are also configured to, when executed by the processing circuitry, cause the apparatus to accept one or more subsequent CP join requests for the multicast address.

In some embodiments, the reject message comprises information associated with a reason for the multicast distribution session not being available for the multicast address associated with the CP join request. In some embodiments, the reject message comprises an indication as to whether a multicast user plane (UP) join request for the multicast service will be accepted.

In another example embodiment, a method is provided. The method includes receiving, from user equipment, a control plane (CP) join request for a multicast service. The method also includes causing provision of a reject message associated with the CP join request to the user equipment in response to a determination that a multicast distribution session is not available for a multicast address associated with the CP join request.

In some embodiments, the method further includes determining a number of rejected CP join requests for the multicast address.

In some embodiments, the method further includes providing information regarding the rejected CP join requests for the multicast address to another network entity.

In some embodiments, the method further includes determining whether to establish a multicast distribution session for the multicast address based on the number of rejected CP join requests. In some embodiments, in response to a determination to proceed with establishing the multicast distribution session, the method further includes establishing the multicast distribution session for the multicast address. Additionally, in some embodiments in response to a determination to proceed with establishing the multicast distribution session, the method further includes accepting one or more subsequent CP join requests for the multicast address.

In some embodiments, the causing the provision of the reject message comprises causing provision of information associated with a reason for the multicast distribution session not being available for the multicast address associated with the CP join request. In some embodiments, the causing the provision of the reject message comprises causing provision of an indication as to whether a multicast user plane (UP) join request for the multicast service will be accepted.

In another example embodiment, a computer program product is provided. The computer program product includes at least one non-transitory computer readable storage medium having computer-executable program code instructions stored therein with the computer-executable program code instructions including program code instructions configured, upon execution, to receive, from user equipment, a control plane (CP) join request for a multicast service. The computer-executable program code instructions are also configured to cause provision of a reject message associated with the CP join request to the user equipment in response to a determination that a multicast distribution session is not available for a multicast address associated with the CP join request.

In some embodiments, the computer-executable program code instructions are also configured to determine a number of rejected CP join requests for the multicast address.

In some embodiments, the computer-executable program code instructions are also configured to provide information regarding the rejected CP join requests for the multicast address to another network entity.

In some embodiments, the computer-executable program code instructions are also configured to determine whether to establish a multicast distribution session for the multicast address based on the number of rejected CP join requests. In some embodiments, in response to a determination to proceed with establishing the multicast distribution session, the computer-executable program code instructions are also configured to determine whether to establish the multicast distribution session for the multicast address. Additionally, in some embodiments in response to a determination to proceed with establishing the multicast distribution session, the computer-executable program code instructions are also configured to accept one or more subsequent CP join requests for the multicast address.

In some embodiments, the reject message comprises information associated with a reason for the multicast distribution session not being available for the multicast address associated with the CP join request. In some embodiments, the reject message comprises an indication as to whether a multicast user plane (UP) join request for the multicast service will be accepted.

In yet another example embodiment, an apparatus is provided that includes means for receiving, from user equipment, a control plane (CP) join request for a multicast service. The apparatus of this example embodiment also includes means for causing provision of a reject message associated with the CP join request to the user equipment in response to a determination that a multicast distribution session is not available for a multicast address associated with the CP join request.

In some embodiments, the apparatus of this example embodiment also includes means for determining a number of rejected CP join requests for the multicast address.

In some embodiments, the apparatus of this example embodiment also includes means for providing information regarding the rejected CP join requests for the multicast address to another network entity.

In some embodiments, the apparatus of this example embodiment also includes means for determining whether to establish a multicast distribution session for the multicast address based on the number of rejected CP join requests. In some embodiments, in response to a determination to proceed with establishing the multicast distribution session, the apparatus of this example embodiment also includes means for establishing the multicast distribution session for the multicast address. Additionally, in some embodiments in response to a determination to proceed with establishing the multicast distribution session, the apparatus of this example embodiment also includes means for accepting one or more subsequent CP join requests for the multicast address.

In some embodiments, the means for causing the provision of the reject message comprises means for causing provision of information associated with a reason for the multicast distribution session not being available for the multicast address associated with the CP join request. In some embodiments, the means for causing the provision of the reject message comprises means for causing provision of an indication as to whether a multicast user plane (UP) join request for the multicast service will be accepted.

In an example embodiment, an apparatus includes processing circuitry and at least one memory including computer program code instructions that are configured to, when executed by the processing circuitry, cause the apparatus to receive a service announcement message associated with a multicast service from a first network entity. The computer program code instructions are also configured to, when executed by the processing circuitry, cause the apparatus to determine that a multicast distribution session is not available for the multicast session. Furthermore, in response to the service announcement message and the determination that a multicast distribution session is not available, the computer program code instructions are also configured to, when executed by the processing circuitry, cause the apparatus to cause provision of a multicast user plane (UP) join request for the multicast service to a second network entity. In response to the multicast UP join request, the computer program code instructions are also configured to, when executed by the processing circuitry, cause the apparatus to receive multicast data.

In some embodiments, the computer program code instructions are also configured to, when executed by the processing circuitry, cause the apparatus to cause the apparatus to receive the multicast data via a protocol data unit (PDU) session.

In some embodiments, the computer program code instructions are also configured to, when executed by the processing circuitry, cause the apparatus to cause provision of a control plane (CP) join request for the multicast service to a third network entity. Additionally, in some embodiments, the computer program code instructions are also configured to, when executed by the processing circuitry, cause the apparatus to receive a reject message associated with the CP join request.

In some embodiments, the computer program code instructions are also configured to, when executed by the processing circuitry, cause the apparatus to cause the provision of the CP join request in response to a multicast-broadcast service support message from a fourth network entity.

In some embodiments, the computer program code instructions are also configured to, when executed by the processing circuitry, cause the apparatus to receive a rejection cause as part of the reject message associated with the CP join request. Additionally, in some embodiments, the computer program code instructions are also configured to, when executed by the processing circuitry, cause the apparatus to determine, based on the rejection cause, whether to send the multicast UP join request.

In some embodiments, the computer program code instructions are also configured to, when executed by the processing circuitry, cause the apparatus to send the multicast UP join request when the rejection cause indicates that there is no multicast distribution session for the multicast session.

In some embodiments, the computer program code instructions are also configured to, when executed by the processing circuitry, cause the apparatus to send the multicast UP join request when the rejection cause indicates that a user equipment has attempted to join the multicast distribution session outside an area where the multicast distribution session is established.

In some embodiments, the computer program code instructions are also configured to, when executed by the processing circuitry, cause the apparatus to receive a UP join accept indication as part of the reject message associated with the CP join request. Additionally, in some embodiments, the computer program code instructions are also configured to, when executed by the processing circuitry, cause the apparatus to determine, based on the UP join accept indication, whether to send the multicast UP join request.

In some embodiments, the computer program code instructions are also configured to, when executed by the processing circuitry, cause the apparatus to monitor for a multicast-broadcast service support message from a fourth network entity. In some embodiments, if no multicast-broadcast service support message is detected, the computer program code instructions are also configured to, when executed by the processing circuitry, cause the apparatus to determine that a multicast distribution session is not available for the multicast session.

In some embodiments, the computer program code instructions are also configured to, when executed by the processing circuitry, cause the apparatus to receive an indication as to whether a multicast distribution session is provided as part of the service announcement message. In some embodiments, the computer program code instructions are also configured to, when executed by the processing circuitry, cause the apparatus to determine that a multicast distribution session is not available for the multicast session based on the indication.

In another example embodiment, a method is provided. The method includes receiving a service announcement message associated with a multicast service from a first network entity. The method also includes determining that a multicast distribution session is not available for the multicast session. The method also includes, in response to the service announcement message and the determination that a multicast distribution session is not available, causing provision of a multicast user plane (UP) join request for the multicast service to a second network entity. The method also includes, in response to the multicast UP join request, receiving multicast data.

In some embodiments, the receiving the multicast data comprises receiving the multicast data via a protocol data unit (PDU) session.

In some embodiments, the determining that the multicast distribution session is not available for the multicast session comprises causing provision of a control plane (CP) join request for the multicast service to a third network entity. Additionally, in some embodiments, the determining that the multicast distribution session is not available for the multicast session comprises receiving a reject message associated with the CP join request.

In some embodiments, the causing the provision of the CP join request comprises causing the provision of the CP join request in response to a multicast-broadcast service support message from a fourth network entity.

In some embodiments, the method further includes receiving a rejection cause as part of the reject message associated with the CP join request. Furthermore, in some embodiments, the method further includes determining, based on the rejection cause, whether to send the multicast UP join request.

In some embodiments, the method further includes sending the multicast UP join request when the rejection cause indicates that there is no multicast distribution session for the multicast session.

In some embodiments, the method further includes sending the multicast UP join request when the rejection cause indicates that a user equipment has attempted to join the multicast distribution session outside an area where the multicast distribution session is established.

In some embodiments, the method further includes receiving a UP join accept indication as part of the reject message associated with the CP join request. Additionally, in some embodiments, the method further includes determining, based on the UP join accept indication, whether to send the multicast UP join request.

In some embodiments, the determining that the multicast distribution session is not available for the multicast session comprises monitoring for a multicast-broadcast service support message from a fourth network entity. In some embodiments, if no multicast-broadcast service support message is detected, the determining that the multicast distribution session is not available for the multicast session comprises determining that a multicast distribution session is not available for the multicast session.

In some embodiments, the receiving the service announcement message comprises receiving an indication as to whether a multicast distribution session is provided as part of the service announcement message. In some embodiments, the receiving the service announcement message comprises determining that a multicast distribution session is not available for the multicast session based on the indication.

In another example embodiment, a computer program product is provided. The computer program product includes at least one non-transitory computer readable storage medium having computer-executable program code instructions stored therein with the computer-executable program code instructions including program code instructions configured, upon execution, to receive a service announcement message associated with a multicast service from a first network entity. The computer-executable program code instructions are also configured to determine that a multicast distribution session is not available for the multicast session. Furthermore, in response to the service announcement message and the determination that a multicast distribution session is not available, the computer-executable program code instructions are also configured to cause provision of a multicast user plane (UP) join request for the multicast service to a second network entity. In response to the multicast UP join request, the computer-executable program code instructions are also configured to cause the apparatus to receive multicast data.

In some embodiments, the computer-executable program code instructions are also configured to cause the apparatus to receive the multicast data via a protocol data unit (PDU) session.

In some embodiments, the computer-executable program code instructions are also configured to cause provision of a control plane (CP) join request for the multicast service to a third network entity. Additionally, in some embodiments, the computer-executable program code instructions are also configured to receive a reject message associated with the CP join request.

In some embodiments, the computer-executable program code instructions are also configured to cause the provision of the CP join request in response to a multicast-broadcast service support message from a fourth network entity.

In some embodiments, the computer-executable program code instructions are also configured to receive a rejection cause as part of the reject message associated with the CP join request. Additionally, in some embodiments, the computer-executable program code instructions are also configured to determine, based on the rejection cause, whether to send the multicast UP join request.

In some embodiments, the computer-executable program code instructions are also configured to send the multicast UP join request when the rejection cause indicates that there is no multicast distribution session for the multicast session.

In some embodiments, the computer-executable program code instructions are also configured to send the multicast UP join request when the rejection cause indicates that a user equipment has attempted to join the multicast distribution session outside an area where the multicast distribution session is established.

In some embodiments, the computer-executable program code instructions are also configured to receive a UP join accept indication as part of the reject message associated with the CP join request. Additionally, in some embodiments, the computer-executable program code instructions are also configured to determine, based on the UP join accept indication, whether to send the multicast UP join request.

In some embodiments, the computer-executable program code instructions are also configured to monitor for a multicast-broadcast service support message from a fourth network entity. In some embodiments, if no multicast-broadcast service support message is detected, the computer-executable program code instructions are also configured to determine that a multicast distribution session is not available for the multicast session.

In some embodiments, the computer-executable program code instructions are also configured to receive an indication as to whether a multicast distribution session is provided as part of the service announcement message. In some embodiments, the computer-executable program code instructions are also configured to determine that a multicast distribution session is not available for the multicast session based on the indication.

In yet another example embodiment, an apparatus is provided that includes means for receiving a service announcement message associated with a multicast service from a first network entity. The apparatus of this example embodiment also includes means for determining that a multicast distribution session is not available for the multicast session. In response to the service announcement message and the determination that a multicast distribution session is not available, the apparatus of this example embodiment also includes means for causing provision of a multicast user plane (UP) join request for the multicast service to a second network entity. In response to the multicast UP join request, the apparatus of this example embodiment also includes means for receiving multicast data.

In some embodiments, the means for receiving the multicast data comprises means for receiving the multicast data via a protocol data unit (PDU) session.

In some embodiments, the means for determining that the multicast distribution session is not available for the multicast session comprises means for causing provision of a control plane (CP) join request for the multicast service to a third network entity. Additionally, in some embodiments, the means for determining that the multicast distribution session is not available for the multicast session comprises means for receiving a reject message associated with the CP join request.

In some embodiments, the means for causing the provision of the CP join request comprises means for causing the provision of the CP join request in response to a multicast-broadcast service support message from a fourth network entity.

In some embodiments, the apparatus of this example embodiment also includes means for receiving a rejection cause as part of the reject message associated with the CP join request. Furthermore, in some embodiments, the apparatus of this example embodiment also includes means for determining, based on the rejection cause, whether to send the multicast UP join request.

In some embodiments, the apparatus of this example embodiment also includes means for sending the multicast UP join request when the rejection cause indicates that there is no multicast distribution session for the multicast session.

In some embodiments, the apparatus of this example embodiment also includes means for sending the multicast UP join request when the rejection cause indicates that a user equipment has attempted to join the multicast distribution session outside an area where the multicast distribution session is established.

In some embodiments, the apparatus of this example embodiment also includes means for receiving a UP join accept indication as part of the reject message associated with the CP join request. Additionally, in some embodiments, the apparatus of this example embodiment also includes means for determining, based on the UP join accept indication, whether to send the multicast UP join request.

In some embodiments, the means for determining that the multicast distribution session is not available for the multicast session comprises means for monitoring for a multicast-broadcast service support message from a fourth network entity. In some embodiments, if no multicast-broadcast service support message is detected, the means for determining that the multicast distribution session is not available for the multicast session comprises means for determining that a multicast distribution session is not available for the multicast session.

In some embodiments, the means for receiving the service announcement message comprises means for receiving an indication as to whether a multicast distribution session is provided as part of the service announcement message. In some embodiments, the means for receiving the service announcement message comprises means for determining that a multicast distribution session is not available for the multicast session based on the indication.

BRIEF DESCRIPTION OF THE DRAWINGS

Figure 1:
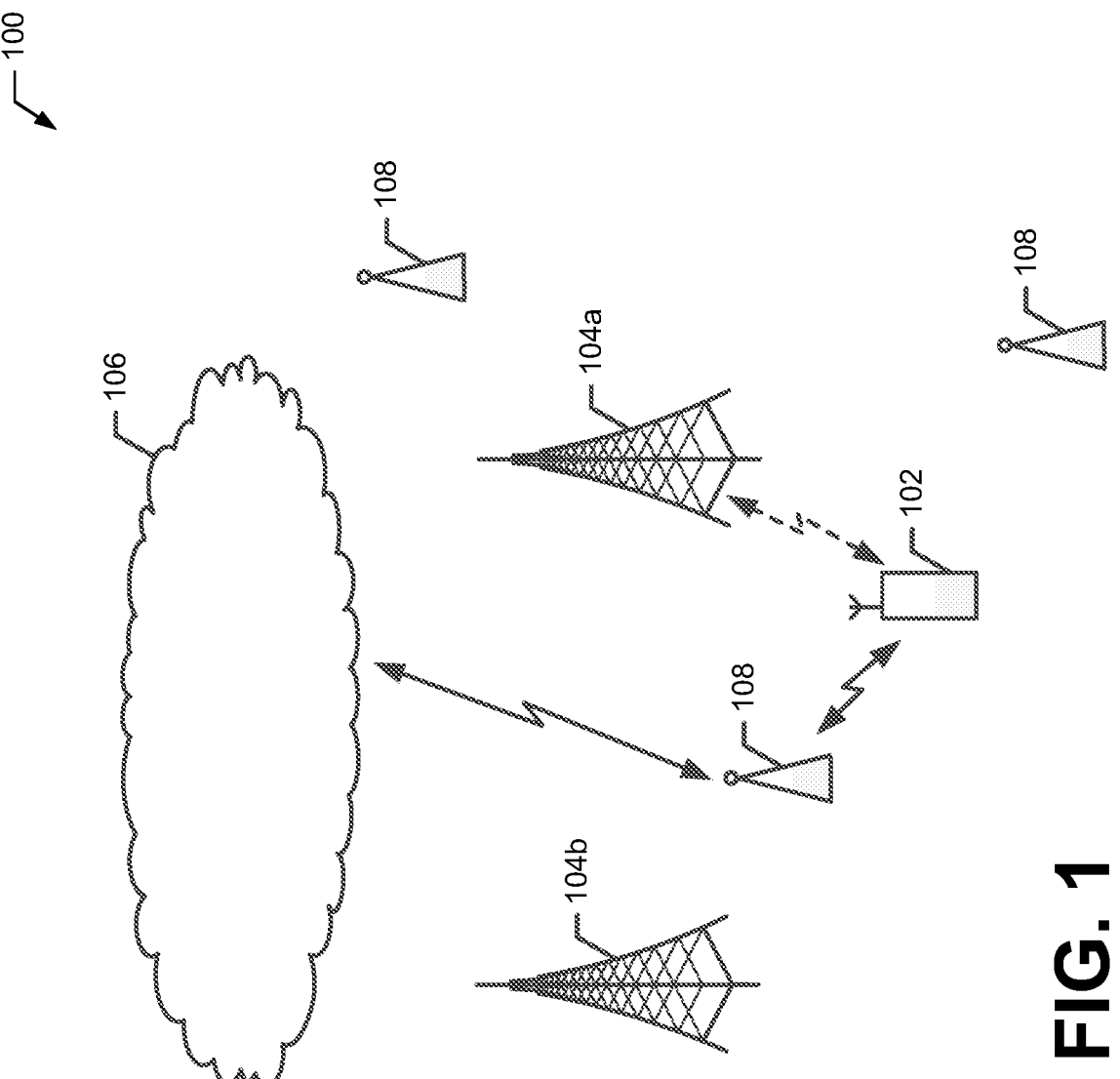
Figure 2:
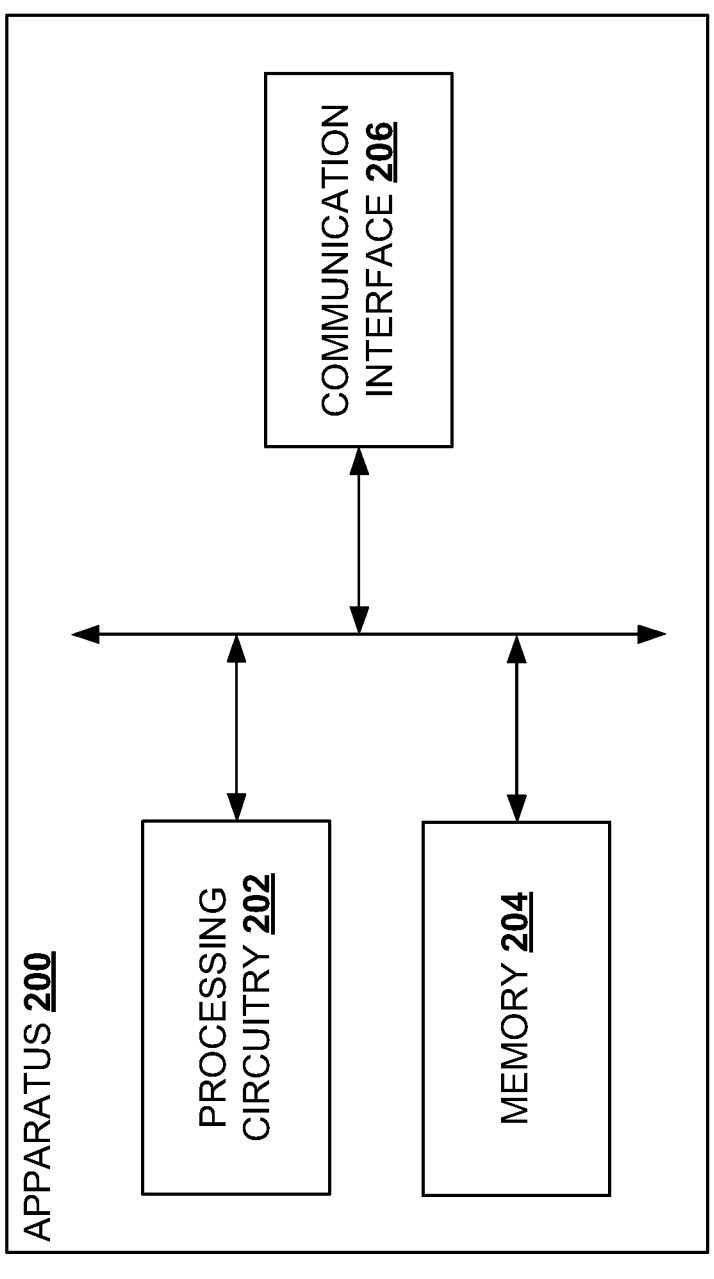
Figure 3:
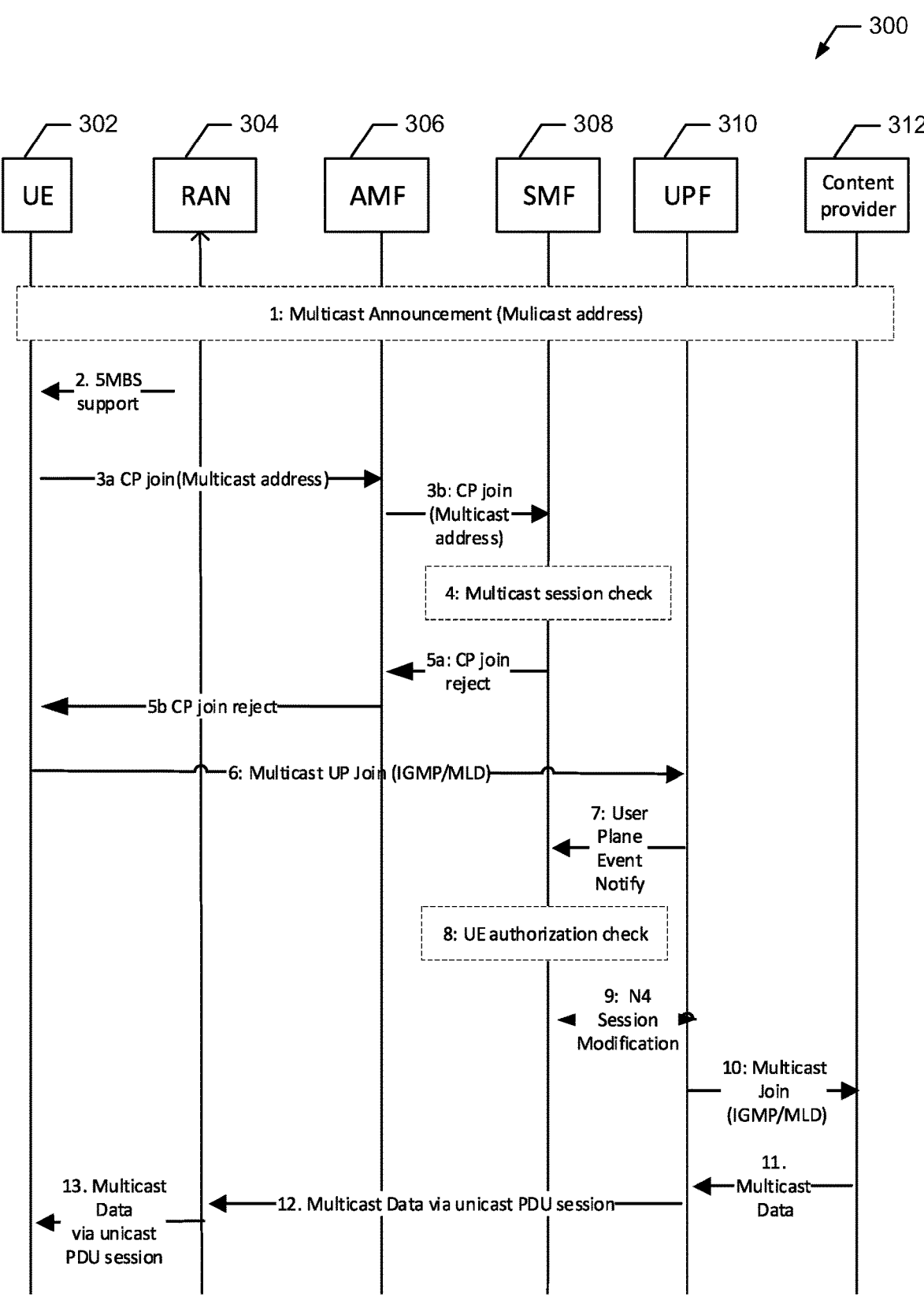
Figure 4:
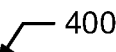

Having thus described certain example embodiments of the invention in general terms, reference will now be made to the accompanying drawings, which are not necessarily drawn to scale, and wherein:

FIG. 1 depicts an example system environment in which implementations in accordance with one or more example embodiments of the present disclosure;

FIG. 2 is a block diagram of an apparatus configured in accordance with one or more example embodiments of the present disclosure;

FIG. 3 illustrates example transmissions between a user equipment and one or more network entities in accordance with one or more example embodiments of the present disclosure;

FIG. 4 illustrates a flowchart illustrating operations performed, such as by the apparatus of FIG. 2, in order to provide for joining a multicast session of a communications network via a network entity, in accordance with one or more example embodiments of the present disclosure; and FIG. 5 illustrates a flowchart illustrating operations performed, such as by the apparatus of FIG. 2, in order to provide for joining a multicast session of a communications network via user equipment, in accordance with one or more example embodiments of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Third generation partnership project (3GPP) $5^{th}$ generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. Next generation systems, which utilize the 5G architecture, utilize virtualized radio access network (RAN) functions and core network functions.

Embodiments will be illustrated herein in conjunction with example communication systems and associated techniques for joining a multicast session of a communications system. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3rd Generation Partnership Project (3GPP) system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the 3GPP TR 23.757 and/or the 3GPP TR 23.316. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

Multicast is a data transmission technique for a communications system where data is transmitted (e.g., transmitted simultaneously) to multiple destinations. In general, a 5G network can provide data connectivity and services for internet protocol services, such as streaming television and provision of other streaming media to user devices. In some embodiments, such service provision can be provided via 5G multicast-broadcast services. For instance, in some embodiments, user equipment can be configured to join a multicast session of a 5G network. In some embodiments, internet protocol television (IPTV) services can be defined as multimedia services, such as television, video, audio, textual media, graphics, data, combinations thereof, and the like that are delivered over IP-based networks managed to support a level of QoS/QoE, security, interactivity, and/or reliability. In some embodiments, usage of IP multicast may be a component of the delivery of IPTV content. In some embodiments, IPTV television channels or the like may be associated with an IP multicast delivery (e.g., an IPv4/IPv6 multicast delivery).

In some embodiments, as part of a multicast procedure, user equipment can indicate a desire to join a multicast session. For instance, in some embodiments, the user equipment can indicate a desire to join a multicast session via a control plane (CP) join request or via a user plane (UP) join request. In some embodiments, a CP join request can be provided via non-access stratum (NAS) signaling associated with a functional layer in a communications system. In some embodiments, the UP join request can be associated with an Internet Group Management Protocol (e.g., IGMP) or a Multicast Listener Discovery (MLD) join request as defined for IP. Furthermore, in some embodiments, a UP join request is associated with a request to join a multicast session in an external IP network. Therefore, it is often desirable to enable user equipment to join an external multicast session. For instance, it is often desirable to enable user equipment to join an external multicast session in combination with a multicast session in a 3GPP network or with a point-to-point protocol data unit (PDU) session in a 3GPP network. While the present disclosure may describe the invention in conjunction with a 5G communications system, the invention also applies to and comprises other networks and network technologies, such as 4G, LTE, 3G, etc. without limitation.

Methods, apparatuses and computer program products are provided in accordance with example embodiments to provide one or more procedures to join a multicast session of a communications network.

In some embodiments, a UE obtains a service announcement for a multicast session associated with a 3GPP radio network. In some embodiments, the service announcement includes an IP multicast address for the multicast session. In some embodiments, based on the service announcement, the user equipment can generate a request to join the multicast session. In some embodiments, if the user equipment obtains an indication from the 3GPP radio network that the network supports 5G multicast-broadcast (5MBS), the user equipment can sends a CP join request (e.g., via NAS signaling) to indicate the multicast address to request joining a corresponding multicast distribution session (e.g., a corresponding 5 MB S session) of the 3GPP network. If there is no multicast distribution session for that multicast address in the 3GPP network, in some embodiments, the network may reject the CP join request. In some embodiments, if the user equipment obtains a rejection of the CP join request or if the user equipment did not obtain an indication from the 3GPP radio network that the network supports 5MBS, the user equipment can send a UP join request. In some embodiment, the UP join request can be processed by the 3GPP network as specified for IPTV (e.g., as specified in 3GPP Release 16). For instance, in some embodiments, multicast content (e.g., multicast data) can be delivered to the user equipment via one or more point-to-point PDU sessions.

FIG. 1 depicts an example communication system environment in which implementations in accordance with an example embodiment of the present disclosure may be performed. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

In one or more embodiments, the system environment 100 is a network environment (e.g., a 3GPP network). As shown in FIG. 1, the system environment 100 includes one or more user equipment (UE) 102 configured to communicate wirelessly, such as via an access network, with a network 106. Although the user equipment 102 may be configured in a variety of different manners, the user equipment 102 may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. The system environment 100, as depicted in FIG. 1, also includes one or more access points 104a and 104b, such as one or more base stations, including but not limited to node Bs, evolved Node Bs (eNB), or the like. In some embodiments, the one or more access points 104a and 104b are one or more cellular access points. In some embodiments, the one or more access points 104a and 104b may define and/or service one or more cells. The one or more access points 104a and 104b may, in turn, be in communication with a network 106, such as a core network via a gateway, such that the one or more access points 104a and 104b establish cellular radio access networks by which the user equipment 102 may communicate with the network 106. The system environment 100 of FIG. 1 may include a plurality of different cellular radio access cells and/or networks or parts of such networks including, for example, a 5G radio access network, an LTE (Long-Term Evolution) radio access network, a UMTS (universal mobile telecommunications system) radio access network, etc. In some example implementations, equipment and other infrastructure associated with multiple different cellular radio access networks may be located at or near structures and/or other equipment associated with a particular access point, such as the one or more access points 104a and 104b.

In some implementations of the system environment 100, the cellular radio access networks serviced by the one or more access points 104a and 104b, and any other access points in a given area are identical, in the sense that as the user equipment 102 moves from an area serviced by access point 104a to an area serviced by access point 104b. The user equipment 102 is able to access the network 106 via a radio access network provided across the one or more access points 104a and 104b. Although not shown, the system environment 100 may also include a controller associated with one or more of the access points 104a and 104b, such as, base stations, for example, so as to facilitate operation of the access points 104a and 104b and management of the user equipment 102 in communication therewith. As shown in FIG. 1, the system environment 100 may also include one or more wireless local area networks (WLANs), each of which may be serviced by a WLAN access point 108 configured to establish wireless communications with the user equipment 102. As such, the user equipment 102 may communicate with the network 106 via a WLAN access point as shown in solid lines in FIG. 1, or, alternatively, via an access point (e.g., access point 104a or access point 104b) as shown in dashed lines. The radio access networks as well as the core networks may consist of additional network elements as routers, switches, servers, gateways, and/or controllers.

In this regard, the implementation a multicast session within the system environment 100 can be accomplished by an apparatus 200 as depicted in FIG. 2. The apparatus 200 may be embodied by and/or incorporated into one or more UEs, such as user equipment 102, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

In some embodiments, the system environment 100 may include one or more of the following network functions (NF): radio access network (RAN), Access and Mobility Management Function (AMF), Session Management Function (SMF), User Plane Function (UPF), Authentication Server Function (AUSF), Data Network (DN), e.g. operator services, Internet access, content provider services, or 3rd party services, Unstructured Data Storage Function (UDSF), Network Exposure Function (NEF), Network Repository Function (NRF), Network Slice Selection Function (NSSF), Policy Control Function (PCF), Unified Data Management (UDM), Unified Data Repository (UDR), UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The system environment may further comprise the following network entities: Service Communication Proxy (SCP) and Security Edge Protection Proxy (SEPP).

Regardless of the manner in which the apparatus 200 is embodied, the apparatus 200 of an example embodiment is configured to include or otherwise be in communication with a processing circuitry 202 and a memory 204. In some embodiments, the apparatus 200 is configured to additionally include or otherwise be in communication with a communication interface 206. In some embodiments, the processing circuitry 202 may be in communication with the memory 204 via a bus for passing information among components of the apparatus 200. The memory 204 may be non-transitory and may include, for example, one or more volatile and/or non-volatile memories. In other words, for example, the memory 204 may be an electronic storage device (e.g., a computer readable storage medium) comprising gates configured to store data (e.g., bits) that may be retrievable by a machine (e.g., a computing device like the processing circuitry 202). The memory 204 may be configured to store information, data, content, applications, instructions, or the like for enabling the apparatus 200 to carry out various functions in accordance with an example embodiment of the present disclosure. For example, the memory 204 could be configured to buffer input data for processing by the processing circuitry 202. Additionally or alternatively, the memory 204 could be configured to store instructions for execution by the processing circuitry 202.

As described above, the apparatus 200 may be embodied by a computing device. However, in some embodiments, the apparatus 200 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 202 may be embodied in a number of different ways. For example, the processing circuitry 202 may be embodied as one or more of various hardware processing means including a processor, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 202 may include one or more processing cores configured to perform independently. A multi-core processor may enable multiprocessing within a single physical package. Additionally or alternatively, the processing circuitry 202 may include one or more processors configured in tandem via the bus to enable independent execution of instructions, pipelining and/or multithreading.

In an example embodiment, the processing circuitry 202 may be configured to execute instructions stored in the memory 204 or otherwise accessible to the processing circuitry 202. Alternatively or additionally, the processing circuitry 202 may be configured to execute hard coded functionality. As such, whether configured by hardware or software methods, or by a combination thereof, the processing circuitry 202 may represent an entity (e.g., physically embodied in circuitry) capable of performing operations according to an embodiment of the present disclosure while configured accordingly. Thus, for example, when the processing circuitry 202 is embodied as an ASIC, FPGA or the like, the processing circuitry 202 may be specifically configured hardware for conducting the operations described herein. Alternatively, as another example, when the processing circuitry 202 is embodied as an executor of software instructions, the instructions may specifically configure the processing circuitry 202 to perform the algorithms and/or operations described herein when the instructions are executed. However, in some cases, the processing circuitry 202 may be a processor of a specific device (e.g., a pass-through display or a mobile terminal) configured to employ an embodiment of the present disclosure by further configuration of the processing circuitry 202 by instructions for performing the algorithms and/or operations described herein. The processing circuitry 202 may include, among other things, a clock, an arithmetic logic unit (ALU) and logic gates configured to support operation of the processing circuitry 202.

The apparatus 200 may optionally include the communication interface 206. The communication interface 206 may be any means such as a device or circuitry embodied in either hardware or a combination of hardware and software that is configured to receive and/or transmit data from/to a network and/or any other device or module in communication with the apparatus. In this regard, the communication interface 206 may include, for example, an antenna (or multiple antennas) and supporting hardware and/or software for enabling communications with a wireless communication network. Additionally or alternatively, the communication interface 206 may include the circuitry for interacting with the antenna(s) to cause transmission of signals via the antenna(s) or to handle receipt of signals received via the antenna(s). In some environments, the communication interface 206 may alternatively or also support wired communication. As such, for example, the communication interface 206 may include a communication modem and/or other hardware/software for supporting communication via cable, digital subscriber line (DSL), universal serial bus (USB) or other mechanisms.

Provided hereinbelow, are example transmissions and/or steps between UE and one or more network entities (e.g., a network device, a network component, a RAN, an AMF, an SMF, a UPF, etc.). The below example transmissions and/or steps provide the foreseen steps or messaging to facilitate a multicast session for the user equipment (e.g., on or more procedures to join a multicast session).

In some embodiments, a UE obtains a service announcement for a multicast session associated with a network (e.g., a 3GPP radio network). In some embodiments, the service announcement includes a multicast address for the multicast session. In some embodiments, the UE can generate a request to join the multicast session. In some embodiments, the UE can generate a request to join the multicast session based on the service announcement (e.g., based on the multicast address). In some embodiments, the service announcement includes an indication as to whether a multicast distribution session is provided for the indicated multicast address.

In some embodiments, a CP join request transmitted by a UE can be rejected by a network and/or a network entity of the network (e.g., by an AMF in the network). Additionally or alternatively, in some embodiments, a network entity can forward a rejected CP join request to another network entity (e.g., the AMF can forward rejected CP join request an SMF in the network).

In some embodiments, if there is no multicast distribution session in the network for a multicast address included in the CP join request, the network may alternatively create a multicast distribution session for the CP join request and/or generate another join request (e.g., an external IGMP or MLD join request) to request reception of data for the multicast session. In some embodiments, the SMF can create the multicast distribution session. For example, in some embodiments, the SMF can configure a UPF of the network to send the other join request (e.g., the external IGMP or MLD join request).

In some embodiments, if the UE is served by a RAN node that does not support 5MBS (e.g. because 5MBS is only supported by RAN nodes in some areas) and does not provide a corresponding indication to the UE, the UE can provide a UP join request. In some embodiments, an SMF that support 5MBS can add the UE to the multicast distribution session and/or can deliver multicast data to the UE via a point-to-point unicast session.

In some embodiments, a network entity (e.g., the AMF or the SMF) can determine information related to a rejected CP join request including, for example, a corresponding UE location and/or a multicast address for the rejected CP join request. In some embodiments, the network entity (e.g., the AMF or the SMF) can provide the information related to the rejected CP join request (e.g., the corresponding UE location and/or the multicast address for the rejected CP join request) to an analytics function such as, for example, an NWDAF. In some embodiments, if a network entity (e.g., the AMF, the SMF, or the NWDAF) determines that a multicast address for the rejected CP join request is requested frequently (e.g., by the UE and/or one or more other UEs in a certain area), the network entity can trigger establishment of a multicast distribution session for an external multicast session and/or joining of the external multicast session. In some embodiments, if a network entity (e.g., the AMF, the SMF, or the NWDAF) determines that a multicast address for the rejected CP join request is requested frequently (e.g., by the UE and/or one or more other UEs in a certain area), the network entity can alternatively decide to accept (e.g., not reject) one or more subsequent CP join requests for the multicast address. For instance, in some embodiments, the network entity can establish a multicast distribution session when receiving a first subsequent join request for the multicast address in response to a determination that the multicast address for the rejected CP join request is requested frequently.

In some embodiments, a network entity can determine a cause for rejecting a CP join request. For instance, in some embodiments a network entity can determine one or more reasons for rejection of a CP join request. A reason for rejection of a CP join request can include, for example, that there is no multicast distribution session for the multicast address provided in the CP join request, that the UE has attempted to join the multicast distribution session outside an area where the multicast distribution session is established, another reason, etc. In some embodiments, the UE can transmit a UP join request in response to receiving a CP join request rejection with one or more rejection causes.

In some embodiments, the CP join request rejection can additionally or alternatively include an indication as to whether a future UP join request will be accepted by the network (e.g., by one or more network entities of the network). In some embodiments, a network entity (e.g., the SMF or the AMF) can determine the indication as to whether a future UP join request will be accepted by the network based on configuration data (e.g. to determine whether a UP join handling in a point-to-point PDU session is supported, etc.) and/or based on whether one or more subscriptions for the UE permits joining the multicast session in a point-to-point PDU session. In some embodiments, the UE generates a UP join request in response to a determination that the indication indicates that the UP join request will be accepted by the network. In some embodiments, the UE can generate the CP join request in response obtaining an indication that the multicast distribution session is provided for the indicated multicast address. Furthermore, in some embodiments, the UE can generate the UP join request in response to obtaining an indication that no multicast distribution session is provided for the indicated multicast address.

FIG. 3 illustrates example transmissions and/or steps between a UE 302 and one or more network entities of a network (e.g., a communications network, a radio network, a 3GPP network, etc.). The one or more network entities can include a RAN 304, an AMF 306, an SMF 308, and/or a UPF 310, according to one or more embodiments. In some embodiments, a multicast announcement message can be generated, at 1. For example, in some embodiments, a content provider 312 (e.g., a content provider device) can generate the multicast announcement message. In some embodiments, the multicast announcement message can be a service message associated with a multicast service (e.g., a multicast session). In some embodiments, the multicast announcement message can include a multicast address for the multicast service. Additionally or alternatively, in some embodiments, the multicast announcement message can include an indication as to whether there is a multicast distribution session for the multicast service. In some embodiments, the content provider 312 can be an external content provider that is external to the communication system (e.g., external to a network that includes the RAN 304, the AMF 306, the SMF 308, and/or the UPF 310). In some embodiments, the multicast announcement message can be received by the UE 302 and/or one or more network entities (e.g., the RAN 304, the AMF 306, the SMF 308, and/or the UPF 310). In some embodiments, a network entity of the network can provide, to the UE 302, an indication as to whether the network supports a multicast-broadcast service (e.g., a 5MBS), at 2. For example, in some embodiments, the RAN 304 can provide, to the UE 302, an indication as to whether the network supports a multicast-broadcast service (e.g., a 5MBS).

In some embodiments, the UE 302 can generate a CP join request, at 3a. In some embodiments, the UE 302 can provide the CP join request to a network entity of the network. For example, in some embodiments, the UE 302 can provide the CP join request to the AMF 306. In some embodiments, the CP join request can include the multicast address. In some embodiments, a network entity can allow the UE 302 to join the multicast session, at 3_b_. For example, in some embodiments, a network entity can allow the UE 302 to join the multicast session based on the multicast address included in the CP join request. In some embodiments, the AMF 306 and/or the SMF 308 can allow the UE 302 to join the multicast session. In some embodiments, the UE 302 can join the multicast session via the CP join request in response to a determination that the network provided an indication as to whether the network supports the multicast-broadcast service (e.g., the 5 MB S).

In some embodiments, a network entity can perform a multicast session check, at 4. For example, in some embodiments, the SMF 308 can perform the multicast session check. In some embodiments, the network entity (e.g., the SMF 308) can determine to reject the CP join request. For instance, in some embodiments, the network entity (e.g., the SMF 308) can determine to reject the CP join request in response to a determination that there is no multicast session for the multicast address included in the CP join request. In some embodiments, the network entity (e.g., the SMF 308) can log the rejection CP join request and/or a corresponding multicast session ID. Additionally or alternatively, in certain embodiments, the network entity (e.g., the SMF 308) can determine to establish a multicast session if one or more future CP join requests for the multicast address are determined to be frequent (e.g., if a number of requests for the multicast address satisfies a defined threshold value).

In some embodiments, a network entity can generate a rejection to the CP join request (e.g., a CP join reject), at 5_a_. For example, in some embodiments, the SMF 308 can generate the rejection to the CP join request (e.g., a CP join reject). In some embodiments, the SMF 308 can provide the rejection to the CP join request (e.g., the CP join reject) to the AMF 306. In some embodiments, a network entity can transmit the rejection to the CP join request (e.g., the CP join reject) to the UE 302, at 5_b_. For example, in some embodiments, the AMF 306 can transmit the rejection to the CP join request (e.g., the CP join reject) to the UE 302. In some embodiments, the rejection to the CP join request (e.g., the CP join reject) can indicate a rejection cause. Additionally or alternatively, in some embodiments, the rejection to the CP join request (e.g., the CP join reject) can include an indication as to whether a UP join is allowed by the network.

In some embodiments, the UE 302 can generate a UP join request (e.g., a multicast UP join request), at 6. In some embodiments, the UP join request can be an IGMP join request or a MLD join request. In some embodiments, the UE 302 can generate the UP join request if the network did not provide and/or if the UE 302 did not receive an indication that the network supports the multicast-broadcast service (e.g., the 5MBS). Additionally or alternatively, in some embodiments, the UE 302 can generate the UP join request if the CP join request was rejected by the network. In some embodiments, UE 302 can generate the UP join request based on one or more rejection causes indicated by the rejection to the CP join request and/or based on an indication as to whether the UP join request is allowed by the network. In some embodiments, UE 302 can transmit the UP join request to a network entity of the network. For example, in some embodiments, the UP join request can be provided to the UPF 310.

In some embodiments, a user plant event notification can be generated by a network entity, at 7. For example, in some embodiments, the UPF 310 can notify the SMF 308 in response to the UP join request being received by the UPF 310. In some embodiments, a UE authorization check can be performed by a network entity, at 8. For example, in some embodiments, the SMF 308 can determine whether the UE 302 is entitled to join the multicast session associated with the UP join request. In some embodiments, an N4 session modification message (e.g., an N4 interface modification) can be generated by a network entity, at 9. For example, in some embodiments, the SMF 308 can request the UPF 310 to join the multicast session in response to a determination that the UE 302 is entitled to join the multicast session associated with the UP join request. In some embodiments, a multicast join message can be generated by a network entity, at 10. For example, in some embodiments, the UPF 310 can generate the multicast join message. In some embodiments, the multicast join message can include an IGMP join request or a MLD join request. Furthermore, in some embodiments, the multicast join message can be an external multicast join message (e.g., an external IGMP or MLD join request). Additionally, in some embodiments, the network entity (e.g., the UPF 310) can transmit the multicast join message to the content provider 312. As such, in some embodiments, the UPF 310 can join an external multicast session associated with the content provider 312.

In some embodiments, the content provider 312 can provide multicast data, at 11. For example, in some embodiments, the content provider 312 can provide the multicast data to the UPF 310. In some embodiments, the multicast data can include video data, audio data, image data, textual media, television data, graphics data, and/or other data. In some embodiments, the UPF 310 can provide the multicast data to another network entity via a unicast PDU session, at 12. For example, in some embodiments, the UPF 310 can provide the multicast data to the RAN 304 via a unicast PDU session. In some embodiments, the unicast PDU session can be a point-to-point PDU session. In some embodiments, a network entity can provide the multicast data to the UE 302 via a unicast PDU session, at 13. For example, in some embodiments, the RAN 304 can provide the multicast data to the UE 302 via a unicast PDU session (e.g., via a point-to-point PDU session).

FIG. 4 illustrates a flowchart depicting a method 400 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 204 of the apparatus 200 employing an embodiment of the present disclosure and executed by the processing circuitry 202. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 4, the operations performed, such as by the apparatus 200 of FIG. 2, in order to provide for joining a multicast session of a communications network via a network entity are depicted, in accordance with one or more embodiments of the present disclosure. As shown in block 402 of FIG. 4, the apparatus 200 includes means, such as the processing circuitry 202, the memory 204, or the like, configured to receive, from user equipment, a control plane (CP) join request for a multicast service.

As shown in block 404 of FIG. 4, the apparatus 200 includes means, such as the processing circuitry 202, the memory 204, or the like, configured to cause provision of a reject message associated with the CP join request to the user equipment in response to a determination that a multicast distribution session is not available for a multicast address associated with the CP join request. In some embodiments, the reject message comprises information associated with a reason for the multicast distribution session not being available for the multicast address associated with the CP join request. Additionally or alternatively, in some embodiments, the reject message comprises an indication as to whether a multicast user plane (UP) join request for the multicast service will be accepted.

In some embodiments, the apparatus 200, such as the processing circuitry 202, can be configured to determine a number of rejected CP join requests for the multicast address. In some embodiments, the apparatus 200, such as the processing circuitry 202, can be configured to provide information regarding the rejected CP join requests for the multicast address to another network entity. In some embodiments, the apparatus 200, such as the processing circuitry 202, can be configured to determine whether to establish a multicast distribution session for the multicast address based on the number of rejected CP join requests. Furthermore, in some embodiments, the apparatus 200, such as the processing circuitry 202, can be configured to, in response to a determination to proceed with establishing the multicast distribution session, establish the multicast distribution session for the multicast address. Additionally or alternatively, in some embodiments, the apparatus 200, such as the processing circuitry 202, can be configured to, in response to a determination to proceed with establishing the multicast distribution session, accept one or more subsequent CP join requests for the multicast address.

In some embodiments, the apparatus 200, such as the processing circuitry 202, can be configured to cause provision of a service announcement message associated with a multicast service to a user equipment. In some embodiments, the apparatus 200, such as the processing circuitry 202, can be configured to cause provision of a multicast address associated with the multicast service via the service announcement message.

In some embodiments, the apparatus 200, such as the processing circuitry 202, can be configured to, in response to receiving the multicast UP join request for the multicast service from the user equipment, receive multicast data associated with the multicast UP join request from a content provider device. In some embodiments, the apparatus 200, such as the processing circuitry 202, can be configured to receive the multicast data based on the multicast address. In some embodiments, the apparatus 200, such as the processing circuitry 202, can be configured to receive the multicast data from the content provider device in response to causing rejection of the CP join request and/or in response to the receiving the multicast UP join request from the user equipment. In some embodiments, the apparatus 200, such as the processing circuitry 202, can be configured to receive the multicast data from the content provider device in response to an indication that a multicast-broadcast service is not supported by a network and in response to the receiving the multicast UP join request from the user equipment.

In some embodiments, the apparatus 200, such as the processing circuitry 202, can be configured to cause provision of the multicast data to the user equipment. In some embodiments, the apparatus 200, such as the processing circuitry 202, can be configured to cause the provision of the multicast data via a PDU session.

In some embodiments, the apparatus 200, such as the processing circuitry 202, can be configured to receive a CP join request for the multicast service from the user equipment. In some embodiments, the apparatus 200, such as the processing circuitry 202, can be configured to cause provision of a reject message associated with the CP join request to the user equipment in response to a determination that a multicast distribution session is not available for a multicast address associated with the CP join request. In some embodiments, the apparatus 200, such as the processing circuitry 202, can be configured to establish a multicast distribution session for a subsequent CP join request from the user equipment. In some embodiments, the apparatus 200, such as the processing circuitry 202, can be configured to cause provision of information associated with a reason for the multicast distribution session not being available for the multicast address associated with the CP join request. In some embodiments, the apparatus 200, such as the processing circuitry 202, can be configured to cause provision of an indication as to whether the multicast UP join request for the multicast service will be accepted.

FIG. 5 illustrates a flowchart depicting a method 500 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 204 of the apparatus 200 employing an embodiment of the present disclosure and executed by the processing circuitry 202. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 5, the operations performed, such as by the apparatus 200 of FIG. 2, in order to provide for joining a multicast session of a communications network via user equipment are depicted, in accordance with one or more embodiments of the present disclosure. As shown in block 502 of FIG. 5, the apparatus 200 includes means, such as the processing circuitry 202, the memory 204, or the like, configured to receive a service announcement message associated with a multicast service from a first network entity.

As shown in block 504 of FIG. 5, the apparatus 200 includes means, such as the processing circuitry 202, the memory 204, or the like, configured to determine that a multicast distribution session is not available for the multicast session.

As shown in block 506 of FIG. 5, the apparatus 200 includes means, such as the processing circuitry 202, the memory 204, or the like, configured to, in response to the service announcement message and the determination that a multicast distribution session is not available, cause provision of a multicast user plane (UP) join request for the multicast service to a second network entity. In some embodiments, the apparatus 200, such as the processing circuitry 202, can be configured to cause the provision of the multicast UP join request (e.g., send the multicast UP join request) when the rejection cause indicates that there is no multicast distribution session for the multicast session. In some embodiments, the apparatus 200, such as the processing circuitry 202, can be configured to cause the provision of the multicast UP join request (e.g., send the multicast UP join request) when the rejection cause indicates that a user equipment has attempted to join the multicast distribution session outside an area where the multicast distribution session is established.

As shown in block 508 of FIG. 5, the apparatus 200 includes means, such as the processing circuitry 202, the memory 204, or the like, configured to, in response to the multicast UP join request, receive multicast data. In some embodiments, the apparatus 200, such as the processing circuitry 202, can be configured to receive the multicast data via a PDU session.

In some embodiments, the apparatus 200, such as the processing circuitry 202, can be configured to cause provision of a control plane (CP) join request for the multicast service to a third network entity. Additionally, in some embodiments, the apparatus 200, such as the processing circuitry 202, can be configured to receive a reject message associated with the CP join request (e.g., in response to a determination that a multicast distribution session is not available for a multicast address associated with the CP join request). In some embodiments, the apparatus 200, such as the processing circuitry 202, can be configured to cause the provision of the CP join request in response to a multicast-broadcast service support message from a fourth network entity.

In some embodiments, the apparatus 200, such as the processing circuitry 202, can be configured to receive a rejection cause as part of the reject message associated with the CP join request. Additionally or alternatively, in some embodiments, the apparatus 200, such as the processing circuitry 202, can be configured to determine, based on the rejection cause, whether to send the multicast UP join request.

In some embodiments, the apparatus 200, such as the processing circuitry 202, can be configured to receive a UP join accept indication as part of the reject message associated with the CP join request. Additionally or alternatively, in some embodiments, the apparatus 200, such as the processing circuitry 202, can be configured to determine, based on the UP join accept indication, whether to send the multicast UP join request.

In some embodiments, the apparatus 200, such as the processing circuitry 202, can be configured to monitor for a multicast-broadcast service support message from a fourth network entity. In some embodiments, if no multicast-broadcast service support message is detected, the apparatus 200, such as the processing circuitry 202, can be configured to determine that a multicast distribution session is not available for the multicast session. In some embodiments, the apparatus 200, such as the processing circuitry 202, can be configured to receive an indication as to whether a multicast distribution session is provided as part of the service announcement message. In some embodiments, the apparatus 200, such as the processing circuitry 202, can be configured to additionally determine that a multicast distribution session is not available for the multicast session based on the indication.

As described above, FIGS. 4-5 are flowcharts of various methods that can be carried out by, e.g., the apparatus 200, and/or according to a computer program product, according to example embodiments of the disclosure. A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as, e.g., in conjunction with the communications flowchart of FIG. 3 or as part of the system of FIG. 1. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
processing circuitry; and
at least one memory storing computer program instructions which, when executed by the processing circuitry, cause the apparatus to perform operations, the operations comprising:
receiving, from user equipment, a control plane (CP) join request to join a multicast distribution session, the CP join request including a multicast address associated with the multicast distribution session;
determining that the multicast distribution session associated with the multicast address of the CP join request is not available;
determining whether to establish the multicast distribution session for the multicast address based on a number of CP join requests to join the multicast distribution session that have been received and rejected; and
in response to the determining determining to establish the multicast distribution session:
establishing the multicast distribution session associated with the multicast address, and
accepting one or more subsequent CP join requests to join the multicast distribution session associated with the multicast address; and
in response to the determining determining not to establish the multicast distribution session:
sending a reject message associated with the CP join request to the user equipment.

2. The apparatus of claim 1, wherein the operations further comprise:
determining the number of CP join requests to join the multicast distribution session associated with the multicast address that have been received and rejected.

3. The apparatus of claim 1, wherein the operations further comprise:
providing, to another network entity, information regarding the CP join request to join the multicast distribution session associated with the multicast address.

4. The apparatus of claim 1, wherein the reject message comprises information associated with a reason that the multicast distribution session is not available for the multicast address associated with the CP join request.

5. The apparatus of claim 1, wherein the reject message comprises an indication as to whether a multicast user plane (UP) join request for the multicast service will be accepted.

6. A method, comprising:
receiving, from user equipment, a control plane (CP) join request to join a multicast distribution session, the CP join request including a multicast address associated with the multicast distribution session;
determining that the multicast distribution session associated with the multicast address of the CP join request is not available;
determining whether to establish the multicast distribution session for the multicast address based on a number of CP join requests to join the multicast distribution session that have been received and rejected; and
in response to the determining determining to establish the multicast distribution session:
establishing the multicast distribution session associated with the multicast address, and
accepting one or more subsequent CP join requests to join the multicast distribution session associated with the multicast address; or
in response to the determining determining not to establish the multicast distribution session:
sending a reject message associated with the CP join request to the user equipment.

7. The method of claim 6, further comprising:
determining the number of CP join requests to join the multicast distribution session associated with the multicast address that have been received and rejected.

8. The method of claim 6, further comprising:
providing, to another network entity, information regarding the CP join request to join the multicast distribution session associated with the multicast address.

9. The method of claim 6, wherein the reject message comprises information associated with a reason that the multicast distribution session is not available for the multicast address associated with the CP join request.

10. The method of claim 6, wherein the reject message comprises an indication as to whether a multicast user plane (UP) join request for the multicast service will be accepted.

11. A non-transitory computer-readable storage medium storing computer program instructions which, when executed by at least one processor of an apparatus, cause the apparatus to perform operations, the operations comprising:
receiving, from user equipment, a control plane (CP) join request to join a multicast distribution session, the CP join request including a multicast address associated with the multicast distribution session;
determining that the multicast distribution session associated with the multicast address of the CP join request is not available;
determining whether to establish the multicast distribution session for the multicast address based on a number of CP join requests to join the multicast distribution session that have been received and rejected; and
in response to the determining determining to establish the multicast distribution session:
establishing the multicast distribution session associated with the multicast address, and accepting one or more subsequent CP join requests to join the multicast distribution session associated with the multicast address; and in response to the determining determining not to establish the multicast distribution session:

sending a reject message associated with the CP join request to the user equipment.

12. The non-transitory computer-readable storage medium of claim 11, wherein the operations further comprise:

determining the number of CP join requests to join the multicast distribution session associated with the multicast address that have been received and rejected.

13. The non-transitory computer-readable storage medium of claim 11, wherein the operations further comprise:

providing, to another network entity, information regarding the CP join request to join the multicast distribution session associated with the multicast address.

14. The non-transitory computer-readable storage medium of claim 11, wherein the reject message comprises information associated with a reason that the multicast distribution session is not available for the multicast address associated with the CP join request.

15. The non-transitory computer-readable storage medium of claim 11, wherein the reject message comprises an indication as to whether a multicast user plane (UP) join request for the multicast service will be accepted.

\* \* \* \* \*